Dec. 27, 1932. T. B. LYLES 1,892,556
SAFETY APPLIANCE FOR AIRPLANES
Filed Sept. 24, 1931
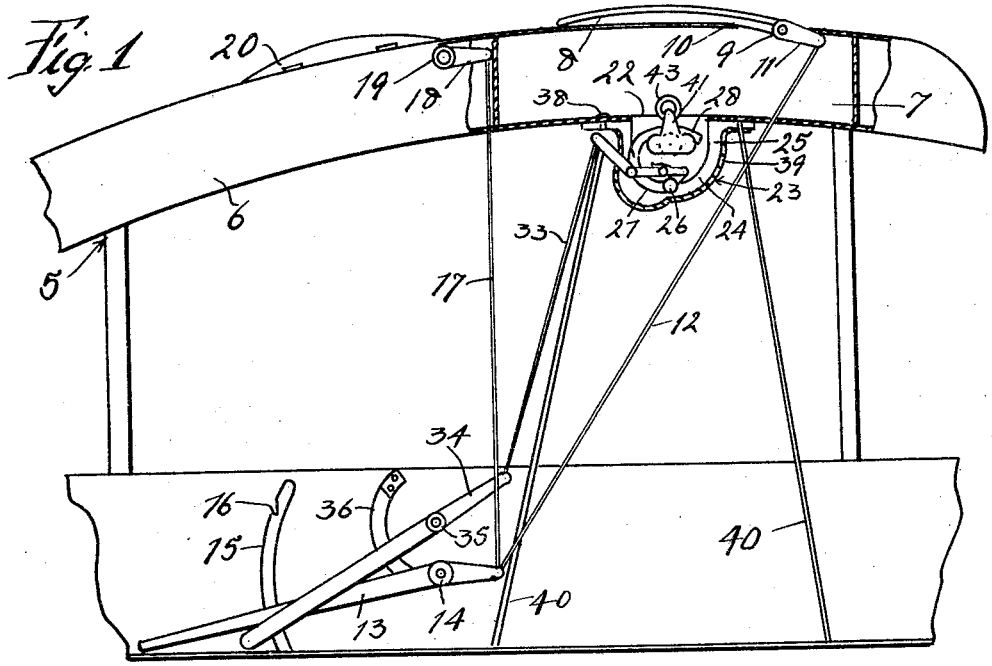
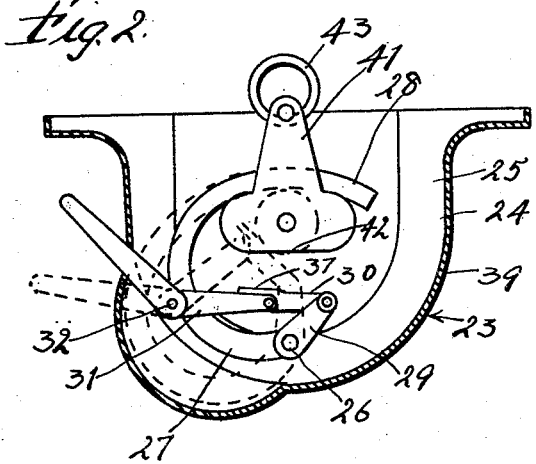
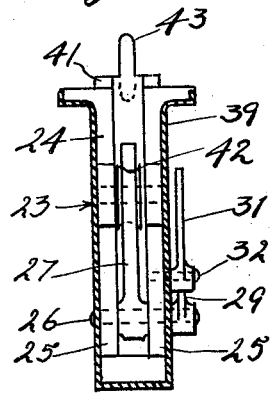
INVENTOR.
Thomas B. Lyles Patented Dec. 27, 1932

1,892,556

UNITED STATES PATENT OFFICE

THOMAS B. LYLES, OF TERRE HAUTE, INDIANA

SAFETY APPLIANCE FOR AIRPLANES

Application filed September 24, 1931. Serial No. 564,867.

My invention relates to new and useful improvements in a safety appliance for airplanes and is particularly adapted for use in connection with the invention disclosed in my Patent No. 1,806,403, dated May 19, 1931.

One of the objects of the present invention is to provide an improved airplane carrying parachute structure in which the parachute may be released or disconnected from the airplane as soon as the disabled airplane has been lowered safely to the ground.

Another object of the invention is to provide an adequate release for the parachute to prevent the airplane from being dragged along the ground which would damage, break and possibly destroy the same, and also to prevent the danger of the possible loss of life of or injury to the occupants by the parachute dragging the airplane along the ground after landing.

Another object of the invention is to provide a manually releasable attaching means for connecting a parachute to an airplane, which means may be actuated at an opportune moment to disconnect the parachute from the airplane after the latter has been lowered safely to the ground to prevent the parachute, if caught in strong winds, from turning the airplane over and dragging the same about.

With these and other ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawing forming a part of this application, in which:—

Fig. 1 is a fragmentary side elevation of an airplane with portions broken away and shown in section to illustrate the details of construction and the relation between the several parts.

Fig. 2 is an enlarged sectional view of the parachute release similar to the illustration in Fig. 1, but removed from the airplane and showing its two positions.

Fig. 3 is an end or edge view of Fig. 2, with the cover in section.

In carrying out my invention as embodied in the one form herein illustrated, the reference numeral 5 represents an airplane including a wing structure 6 in which is formed a compartment 7 between the upper and lower skins of the wing structure for the reception of the main parachute, and said compartment is preferably located at a point midway between the ends of the wing structure over the body or fuselage of the airplane and preferably adjacent the forward edge of said wing structure, although the latter position will be regulated to a considerable extent by the center of gravity of the airplane as a whole.

The top of the compartment 7 is open to provide for placing the main parachute therein and to permit its exit when necessary or desirable, but said open end is normally closed by a cover or closure 8 hinged at its forward edge to the top of the wing structure by connection with the shaft 9.

The closure 8 is latched in a closed position in any suitable manner as shown and described in my former patent above referred to and when the closure is unfastened it may be opened by the lifting arms 10 fixed to the shaft 9, the latter being rotated by a crank 11 to which is fastened one end of a connecting rod or equivalent element 12, the opposite end of said connecting rod being attached to a closure operating lever 13 pivoted as at 14 and said operating lever coacts with the holding member 15 provided with a notch 16 to receive a part of the operating lever to hold the latter in the position where it is in the region of the notch 16.

To the closure operating lever 13 is also attached one end of another connecting rod 17 while the opposite end of said connecting rod is attached to a crank arm 18 fixed to a shaft 19 which controls latches for the closure means 20 of the secondary compartment produced by said closure means on top of the wing structure and said secondary compartment houses the pilot parachute which is connected with the main parachute. The closure means 20 are spring operated in any suitable manner for opening the same when unfastened by operation of the operating lever 13.

The description so far relates to the main features of the invention illustrated in my former Patent #1,806,403, dated May 19, 1931, and has been referred to herein only for the purpose of making plain the present invention.

The lower skin of the wing structure or the bottom wall of the compartment 7 is provided with an opening 22 in the region of which is located the parachute release 23 including a support 24 which may be in the form of a pair of U-shaped hangers 25 secured to the underside of the wing structure, one at each side of the opening 22.

On the support or between the hangers is mounted an axle 26 to which is fixed one end of a C-shaped hook 27, the nose 28 of which operates between the two hangers and lengthwise of the opening 22, the longitudinal center of which is parallel with the longitudinal center of the body of the airplane.

To the axle 26 is fixed a crank 29 pivotally connected to one end of a link 30, the opposite end of said link being pivotally connected with one of the arms of a bell crank lever 31 which is journalled upon a trunnion 32 projecting one side of the support or the outer face of one of the hangers.

To the other arm of the bell crank lever is connected one end of a connecting rod 33, the end of which is fastened to an operating lever 34 which may be pivoted intermediate its ends as at 35. This operating lever like the other operating lever 13 should be located in a position whereby the handle end will be within easy reach of the pilot or operator of the airplane or other occupant who is sufficiently familiar with the landing of airplanes to be able to operate the release at the opportune moment. In order to maintain the operating lever 34 in its set position as shown in Fig. 1, a holding member 36 is provided for cooperation therewith. To further assist in holding the parts in their set positions and prevent an erroneous operation of the device, the link 30 is prevented from passing below a horizontal line when in endwise alignment with the arm of the bell crank lever to which said link is connected, by means of a stop 37 on one of the coacting parts, as the link 30, which will contact with the other member and limit the downward movement of a joint between the two parts to a position where said parts are in endwise alignment as shown in Fig. 2.

The support is fastened to the underside of the wing structure by means of bolts 38 or equivalent fastening devices which bolts may also be utilized to hold a cover 39 in place which cover encloses the support and the hook and prevents the passage of strong air currents through the opening 22 into the compartment 7. The support or the wing structure in the region of said support is braced by struts 40 extending between the body or other suitable part of the airplane and the lower part of the wing structure so that the strain upon the airplane when suspended from the parachute will be distributed over a considerable portion of the airplane.

A pulley block 41 has a wheel 42 for cooperation with the curved nose 28 of the hook 27 and also carries a ring 43 to which the shroud lines of the parachute are fastened and said pulley block is of a size that permits it to freely pass through the opening 22 and between the parts of the support or hangers.

When the desire or necessity arises to use the parachutes, the operating lever 13 is actuated in the proper direction to release the covers or closures 8 and 20. This will permit the pilot parachute to be blown off the top of the wing structure and as soon as it is opened in the wind or by the air currents, it will begin drawing the main parachute out of the compartment 7 and as soon as the shroud lines of said main parachute are taut, said main parachute will open and thus support the airplane through the ring 43, the pulley block, the hook 27 and the support 24 permitting the airplane to be safely lowered to the ground in an upright position without damage to the airplane structure or injury to its occupants.

This would be fine if soon as the airplane touched the ground the parachute entered a calm strata of air so that said parachute would drop straight down to the ground, but it is seldom that any condition like this would occur, and a strong gust of wind would easily turn the airplane over on its side and drag the same along the ground, damaging and possibly destroying the airplane and possibly injuring and even killing the occupants.

This being so, I have found it necessary to release the parachute as soon as the airplane touches the ground. To do this, an occupant of the airplane must actuate the operating lever 34 in the proper direction to throw the hook 27 back as shown by dotted lines in Fig. 2, causing the pulley block 41 to roll off the nose 28 of said hook, thus disconnecting the parachute from the airplane and permitting the former to blow off wherever the wind may carry it, leaving the airplane standing where it landed.

Of course I do not wish to be limited to the exact details of construction as herein shown, as these may be varied within the limits of the appended claim without departing from the spirit of my invention.

Having thus fully described my invention, what I claim as new and useful is;—

In a device of the kind described, the combination of an airplane having a parachute compartment in the wing structure, a support secured to the underside of the wing structure and having a space in communication with the parachute compartment through an opening in the bottom of the wing structure, means to brace the wing structure in the region of the support, a C-shaped hook pivoted in said support, a parachute to be housed in the compartment and released therefrom for lowering the airplane to the ground when the airplane is disabled, a pulley block attached to the parachute and detachably connected with the hook and manually operable means controlling the positions of said hook, whereby it may be moved to a retracted position to permit the pulley block to become disengaged therefrom for releasing the parachute.

In testimony whereof, I have hereunto affixed my signature.

THOMAS B. LYLES.